United States Patent Office 3,578,555
Patented May 11, 1971

3,578,555
SILICONE-ALUM TREATMENT OF PERLITE FIBER INSULATION BOARD AND PRODUCT THEREOF
Otto A. Oshida and Jon P. Gilmore, Albuquerque, N. Mex., assignors to Grefco, Inc., Philadelphia, Pa.
No Drawing. Filed Dec. 12, 1968, Ser. No. 783,434
Int. Cl. D21h 3/36
U.S. Cl. 162—164                                    8 Claims

ABSTRACT OF THE DISCLOSURE

A high degree of water repellency is conferred on perlite-cellulose fiber insulation board by uniformly incorporating both a silicone and an acid aluminum salt in the aqueous board forming mix.

THE PRIOR ART

In the manufacture of perlite insulation board products consisting primarily of expanded perlite aggregate and cellulosic fibers, sizing agents such as asphalt, rosin or wax emulsions are generally used to impart water resistance to the finished products. Typically, an asphalt emulsion is employed at a 6% level, on a dry basis, to reduce the water absorption ability of a perlite-pulp board to less than 2% by volume on immersion under one inch of water for a period of two hours.

To use silicones to achieve water repellency is of course known, as shown in U.S. Pat. 2,884,380, where a material of that type is employed in conjunction with certain polymers such as polyvinyl alcohol, acrylics, starch and carboxymethyl cellulose to give them a water repellency which renders them available for use in perlite-clay fiber insulation material. It is interesting to note in this respect that silicones are said to be unnecessary when the organic material is a somewhat less polar material such as asphalt or polyvinyl acetate.

Alum, i.e. $(NH_4)_2SO_4 \cdot Al_2(SO_4)_3 \cdot 24H_2O$, has been used in insulation material consisting of vermiculite or the like, and portland cement. According to U.S. Pat. 2,364,344, the aluminum salt is added in small amounts, as part of an "active" composition which contains some starch and a stearate. It is also common practice to use alum to break up asphalt emulsions in board mixes.

OBJECT OF THE INVENTION

The principal object of this invention is to provide a water resistant insulating composition that is substantially free from flammable organic additives.

SUMMARY OF THE INVENTION

This and other objects that shall become evident upon description of the invention, have been accomplished by the discovery that water resistant perlite-fiber insulation structures can be obtained by substituting for the common organic water-proofing agents, a mixture consisting of a silicone and acid aluminum salt. That water repellency can be achieved in such a composition without the organic agents of the prior art and by the mixture of ingredients just named, is rather surprising since neither of these ingredients has been successful in the present application in the absence of the other.

DETAILED DESCRIPTION OF THE INVENTION

The following examples will serve to illustrate the practice and the advantages of the invention. They are not to be construed as limitations beyond those set by the appended claims.

The basic insulation material with which the invention is concerned is that described in several U.S. patents, of which U.S. 2,634,207 and 3,042,578 may be considered representative. The material is most often formed as a board from a slurry consisting of expanded perlite particles, 60 to 80% dry weight, fibers usually of the cellulosic type, 35 to 15%, and a waterproofing agent such as emulsified asphalt, 5 to 10%, dry basis. The slurry, formulated at a solids content of about 3 to 8%, is fed onto a moving foraminous support to form a mat and the moisture is then removed by appropriate means.

The significant modification made in this process according to the present invention is, as pointed out earlier, the elimination of most, if not all, of the oragnic waterproofing agent in favor of a silicone-aluminum salt mixture. A silicone fluid is added to the fiber or to the perlite during the mixing operation and this is followed by incorporation of an acid aluminum salt, e.g. alum, to the slurry prior to board formation. In this manner, excellent water resistance has been obtained with relatively small quantities of highly diluted silicones and acid aluminum salts.

The quantitative effectiveness of the silicone-salt mixtures shall now be illustrated. All parts and percentages used in these and other examples are on a weight basis unless otherwise noted.

Effect of silicone-aluminum salt treatment of perlite-cellulosic fiber boards

The boards were made from a standard expanded perlite passing a 30 mesh screen and having a density of 3 to 4 lbs. per cubic foot, and an aqueous slurry of paper pulp with a solids content of 16% by weight. They were prepared by mixing the previously pulped paper slurry, 81.9 parts, with the perlite, 38.2 parts, and water, 900 parts, dewatering the mixture on a foraminous belt or structure and drying the product in the conventional manner. The silicone solution employed was added to the pulp or to the perlite during the mixing operation. Aluminum salts were incorporated in the mix prior to board formation.

The waterproofing additives were silicones XZ8–008 and Z–6020, products of the Dow-Corning Corporation. They contained 25% silicone by weight and were employed at dilutions of 1:50 and 1:70. XZ8–008 is a methylphenyl-silicone polymer that has not been neutralized with sodium hydroxide. Z–6020, on the other hand, is amino-functional silicone with an ability to couple organic and inorganic materials. Aluminum sulfate was the salt selected for these boards and it was used at the level of ½ part.

The proportions of silicone used in Examples 1 to 8 are given in Table 1.

TABLE 1.—PERLITE-CELLULOSIC FIBER BOARDS

[Ratio of fixed ingredients (dry basis): perlite, 38.2 parts; paper, 13.1 parts. The alum used is Al₂(SO₄)₃]

| | Mixture characteristics | | Board properties | | | |
|---|---|---|---|---|---|---|
| | Additives | Dry basis parts (percent) | pH | Density, lb./ft.³ | Rupture modulus, p.s.i. | Water absorption, percent volume |
| Example: | | | | | | |
| 1 | 12.3 parts, 1:50 XZ8-008 Alum | 0.06, (0.12%) 0 | 7.3 | 9.4 | 52 | 44.7 |
| 2 | 12.3 parts, 1:50 XZ8-008 Alum | 0.06, (0.12%) 0.5, (1%) | 5.5 | 9.4 | 46 | 1.9 |
| 3 | 12.3 parts, 1:50 Z-6020 Alum | 0.06, (0.12%) 0 | 7.0 | 9.3 | 57 | 5.5 |
| 4 | 12.3 parts, 1:50 Z-6020 Alum | 0.06, (0.12%) 0.5, (1%) | 5.1 | 9.4 | 47 | 2.2 |
| 5 | 12.3 parts, 1:70 XZ8-008 Alum | 0.04, (0.08%) 0 | 7.1 | 9.4 | 47 | 38.7 |
| 6 | 12.3 parts, 1:70 XZ8-008 Alum | 0.04, (0.08%) 0.5, (1%) | 5.1 | 9.5 | | 1.8 |
| 7 | 12.3 parts, 1:70 Z-6020 Alum | 0.04, (0.08%) 0 | 7.5 | 9.3 | 48 | 5.3 |
| 8 | 12.3 parts, 1:70 Z-6020 Alum | 0.04, (0.08%) 0.5, (1%) | 4.0 | 9.5 | 53 | 2.2 |

These data clearly demonstrate the advantage of using an aluminum salt with various amounts of silicone for waterproofing perlite-paper boards. The effect remains striking even with the more effective silicones such as the amino material of Examples 3, 4, 7 and 8.

Effect of silicone-aluminum salt treatment of perlite-cellulosic fiber-clay boards The materials used in these embodiments were: expanded perlite of 3 to 4 lb./cubic foot density (P); an aqueous paper pulp suspension having a known solids content (F); a clay (C); water swelling (S), Bentonite #90, or non-swelling (N), Panther Creek brand. Aluminum sulfate (Al) was used where indicated. The silicones (Sil) employed were again XZ8-008 (25% solids) and in addition DC-772 (30% solids), another Dow-Corning product consisting of sodium hydroxide neutralized polymeric hydrolysis product of methylchlorosilane. These ingredients were used in the weight proportions indicated in Table 2, under the symbols just noted, in the brackets following each ingredient.

On examination of these formulations and results, it is again apparent that the aluminum salt-silicone treatment of perlite boards is still strikingly beneficial even when swelling and non-swelling clays are incorporated in the boards. In the case of water-swelling clays, the effect has been noted down to 35-14-1 perlite-fiber-clay proportions.

Variations of silicone level in boards

In another series of embodiments carried out with the materials used in Examples 13 and 14, different quantities of XZ8-008 silicone (25% solids) were added, with or without dilution, to the pulp slurry. The alum was also added in the form of a solution. Net additions, on dry basis, are recorded in Table 3. It was found that within the ranges tried, boards of the particular compositions used showed a water absorption of 38.8% to 40.4% by weight in the absence of aluminum salts and of 1.0 to 1.7% with aluminum sulfate present. The variations and results are presented in Table 3.

TABLE 2.—EFFECT OF ALUM-SILICONE TREATMENT ON CLAY-PERLITE BOARDS

| | Mixture characteristics: composition, dry basis (parts by weight, percent) | | | | | | Board properties | | |
|---|---|---|---|---|---|---|---|---|---|
| | P | F[1] | C | Sil[2] | Al[3] | pH | Density, lb./ft.³ | Rupture modulus, p.s.i. | Water absorption percent by volume |
| Example: | | | | | | | | | |
| 9 | 35 | 12 | 3S | XZ8-008 .02, (.04%) | 1, (2%) | 5 | 9.7 | 47 | 2.2 |
| 10 | 35 | 12 | 3S | XZ8-008 .02, (.04%) | | 6 | 9.4 | 49 | 58.8 |
| 11 | 35 | 12 | 3S | DC-772 .024, (.05%) | 1, (2%) | 5 | 9.5 | 37 | 1.68 |
| 12 | 35 | 12 | 3S | DC-772 .024, (.05%) | | 6 | 9.3 | 56 | 55.0 |
| 13 | 34 | 12 | 1N | XZ8-008[4] .05, (.1%) | | 6.6 | 9.1 | 68 | 38.8 |
| 14 | 34 | 12 | 1N | XZ8-008[4] .05, (.1%) | 1, (2%) | 4.5 | 9.1 | 58 | 1.0 |

[1] Solids contents of paper fiber aqueous slurry was either 34.7% or 16.6% by weight, a point of no relevance since the table figures are on a dry basis.
[2] Silicones were used as various dilutions such as 1:100 and 1:50.
[3] Added as 10% solution to wet mix.
[4] Added to pulp suspension.

TABLE 3.—EFFECT OF SILICONE CONCENTRATION

| | Mixture characteristics | | | Board properties | | |
|---|---|---|---|---|---|---|
| | Silicone, parts (percent) | Alum parts (percent) | pH | Density, lb./ft. | Rupture modulus, p.s.i. | Water absorption, percent by volume |
| Example: | | | | | | |
| 13 | .05, (.1%) | | 6.6 | 9.1 | 68 | 38.8 |
| 15 | .025, (.05%) | | 6.5 | 9.2 | 61 | 40.4 |
| 16 | .10, (.2%) | | 7.4 | 9.2 | 73 | 40.1 |
| 14 | .05, (.1%) | 1, (2%) | 4.5 | 9.1 | 58 | 1.0 |
| 17 | .025, (.05%) | 1, (2%) | 4.5 | 9.1 | 53 | 1.4 |
| 18 | .10, (.2%) | 1, (2%) | 4.5 | 9.0 | 51 | 1.1 |
| 19 | .06, (.1%) | 1, (2%) | 4.8 | 9.8 | | 1.3 |
| 20 | .48, (.8%) | 1, (2%) | 4.8 | 9.9 | | 1.3 |
| 21 | .24, (.4%) | 1, (2%) | 4.8 | 9.9 | | 1.4 |
| 22 | .012, (.02%) | 1, (2%) | 4.8 | 9.9 | | 1.7 |
| 23 | .006, (.01%) | 1, (2%) | 4.7 | 9.9 | | 1.6 |

NOTE.—Board composition, parts by weight-dry basis. Examples 13 to 18: perlite, 34; paper, 12; non-swelling clay, 1. Examples 19 to 23: perlite, 36; paper, 15; non-swelling clay, 2.5 parts.

Variation in mode of silicone incorporation

Examples 24–29.—The mode of addition of silicone, in the quantities used in Examples 13 to 18, to perlite-fiber-clay boards of the formulations given in these examples, with and without the same quantity of aluminum sulfate used in those same examples, proved to have a negligible effect on board properties. In six parallel embodiments which shall be labelled Examples 24 to 29, the silicone solution used in Examples 13 to 18 was diluted with 100 parts of water and it was applied to the perlite aggregate before mixing in the pulp suspension. The perlite was not dried after treatment with the silicone.

Boards thus prepared had a rupture modulus of 58 to 62 p.s.i. and a water absorption of 42.6 to 45.1% in the absence of aluminum sulfate, while the use of the latter yielded boards with a modulus of 54 to 61 and an absorption of 1.1 to 1.2% by volume. This is comparable to Table 3 results.

Variation in aluminum salt level in boards

Another series of boards was prepared with conventional mixtures of perlite, paper and clay. The silicones used were XZ8008 (25% solids) and DC-772 (30% solids); they have been described earlier. Convenient dilutions were employed for all soluble and dispersible materials, with the net amounts incorporated in the final boards being recorded in Table 4. The nature and quantities of aluminum salts employed are reported in the table as well as the results obtained by these variations.

TABLE 4.—EFFECT OF ALUMINUM SALT CONCENTRATION

| | Mixture characteristics | | | Board properties | | |
|---|---|---|---|---|---|---|
| | Board type [1] | Silicone used | $Al_2(SO_4)_3$ dry basis parts, percent | pH | Density, lbs./ft.³ | Rupture modulus, p.s.i. | Water Absorption, percent volume |
| Example: | | | | | | | |
| 30 | I | No | 0 | 6.0 | 9.8 | | 61.0 |
| 31 | I | Yes | 0 | 6.8 | 9.5 | | 56.3 |
| 32 | I | No | 1.0, (2%) | 3.5 | 9.7 | | 36.6 |
| 33 | II | No | 0 | 6.9 | 9.8 | 47.2 | 37.6 |
| 34 | II | Yes | 0 | 7.3 | 10.0 | | 44.1 |
| 35 | II | Yes | 0.05, (0.1%) | 6.6 | 10.0 | 40.1 | 1.3 |
| 36 | II | Yes | 0.13, (0.25%) | 5.9 | 10.2 | 40.9 | 1.2 |
| 37 | II | Yes | 0.51, (0.9%) | 5.0 | 10.0 | 37.1 | 1.2 |
| 38 | I | Yes | 0.50, (1.0%) | 4.6 | 9.8 | | 1.8 |
| 39 | I | Yes | 1.0, (2.0%) | 5.1 | 9.5 | | 1.6 |
| 40 | II | Yes | 1.53, (2.5%) | 4.8 | 10.1 | 35.6 | 1.9 |
| 41 | II | Yes | 1.9, (3.0%) | 4.5 | 10.1 | 27.0 | 1.4 |
| 42 | I | Yes | 2.0, (4.0%) | 3.3 | 9.9 | | 1.9 |

[1] Type I: perlite, 35; paper, 14; bentonite 90, 1; silicone XZ8008 (when used), 0.02 part net (~0.04% net); Type II: perlite 36; paper, 15; non-swelling clay, 2.5; silicone DC-772 (when used), 0.06 part net (~0.11% net).

A comparison of these results shows that boards treated with both a silicone and an aluminum salt have vastly superior water resistance than those treated with only a silicone (Examples 31 and 34) or an aluminum salt (Example 32), or not treated at all (Examples 30 and 33). It is also evident that the quantity of aluminum salt employed with the silicone may be varied widely with no detriment to the impermeability of the product.

Effect of the nature of the aluminum salt

In this set of examples, various aluminum salts are used in conjunction with silicones to achieve the desired waterproofing of perlite boards. The types of boards used in this series are those described in Table 4 and are therefore referred to here again as Types I and II. The actual salts and concentrations used are given in Table 5 along with the most significant improved property of the treated board, water adsorption. Silicone was used in every one of these embodiments.

TABLE 5.—EFFECT OF THE NATURE OF THE ALUMINUM SALT

| Ex. | Board type | Aluminum salt | | | | Board properties | |
|---|---|---|---|---|---|---|---|
| | | Nature | Content, dry basis | | pH | Density, lbs./ft.$^3$ | Water absorption, percent by volume |
| | | | Parts | Percent | | | |
| 39 | I | $Al_2(SO_4)_3$ | 1.0 | 2 | 5.1 | 9.5 | 1.6 |
| 19 | II | $Al_2(SO_4)_3$ | 1.0 | 2 | 4.8 | 9.8 | 1.3 |
| 43 | I | $AlCl_3$ | 1.0 | 2 | 4.1 | 9.9 | 1.8 |
| 44 | II | $NH_4Al$ [a] | 1.0 | 2 | 5.2 | 9.7 | 1.2 |
| 45 | II | KAl [b] | 1.0 | 2 | 5.2 | 9.7 | 1.3 |
| 46 | I | Conc. HCl | (a) | | 5.7 | 9.8 | 56.1 |
| 47 | I | Conc. HCl | (b) | | 5.2 | 10.0 | 54.6 |

[a] Ammonium aluminum sulfate and potassium aluminum sulfate.
[b] Enough used to reach indicated pH.

The data in Table 5 demonstrate that while acid aluminum salts are effective with silicones in waterproofing perlite boards, the synergism cannot be duplicated by merely substituting hydrogen ions (Examples 46 and 47).

The silicones that are used in the practice of this invention are those semi-organic polymers consisting of a chain of alternate silicon and oxygen atoms to which are attached one or more types of organic radicals such as the methyl, ethyl, phenyl and other similar groups. Functional groups such as amino and hydroxy groups may be present on some of these organic radicals; they may facilitate the coupling of organic and inorganic materials without interfering with the water-repellent characteristics of the silicones. Silicones are generally prepared by the condensation of monomeric compounds such as methyltrichlorosilane, methylphenyldichlorosilane, substituted alkyl or aryl chlorosilanes and the like. The condensation product may or may not be neutralized before use in the board mixes of this invention.

The aluminum salt requirements of the perlite board can be met by those aluminum salts that yield acid solution with water. Among these are included aluminum chloride, aluminum sulfate and the various alums known to the art, namely ammonium aluminum sulfate, potassium aluminum sulfate and sodium aluminum sulfate. Mixtures of these salts, as well as mixtures of water-repellent silicones may be used.

While the benefits of the invention may be obtained by incorporating from about 0.01% to 1% or more silicone and from about 0.1% to about 3.5% aluminum salt into the aqueous board forming mix, the best results have been achieved by limiting the silicone content to the range of 0.04 to 0.1% and the aluminum salt content to 0.1 to 2.0%. These percentages are calculated on an anhydrous component basis and represent the proportions of additives found in the board mix. Obviously, materials of various degrees of hydration or dilution may be employed for the convenient practice of the invention.

We claim:

1. A water resistant perlite fiber insulation board into which has been uniformly incorporated, on a dry board weight basis, from about 0.1 to about 3.5% of an acid aluminum salt, and from about 0.01 to about 1% of a water dilutable silicone selected from the class consisting of alkyl-, aryl- and alkylaryl-substituted polysiloxanes.

2. The board of claim 1 wherein the acid aluminum salt is aluminum sulfate.

3. The board of claim 1 wherein the acid aluminum salt is an alum.

4. A water resistant perlite fiber insulation board into which has been uniformly incorporated, on a dry board weight basis, from about 0.1% to about 2.0% aluminum sulfate and from about 0.04 to about 0.1% of a polysiloxane selected from the group consisting of methyl-, phenyl- and methylphenyl-polysiloxanes.

5. The board of claim 4 wherein the polysiloxane molecule contains reactive substituents selected from the class consisting of the amino and hydroxyl groups.

6. In a process for forming light weight insulating material comprising (1) making an aqueous pourable slurry comprising substantially (a) cellular expanded perlite of 20 mesh and smaller size and (b) fiber, (2) mixing the slurry until uniform distribution of the fiber is obtained, (3) pouring the uniform slurry onto a moving foraminous surface, (4) dewatering the slurry to form a mat and (5) drying the mat in board form;

the improvement consisting of incorporating consecutively into the slurry, from about 0.01 to about 1% of a water dilutable silicone selected from the class consisting of alkyl-, aryl- and alkaryl-substituted polysiloxanes, and from about 0.1 to about 3.5% of an acid aluminum salt.

7. In the process of claim 6, the step of incorporating the silicone to the aqueous perlite slurry.

8. In the process of claim 6, the step of incorporating the silicone to a previously formed aqueous fiber suspension before slurrying with the perlite.

References Cited

UNITED STATES PATENTS

| 2,507,200 | 5/1950 | Elliott et al. | 162—164X |
| 3,042,578 | 7/1962 | Denning | 162—181X |
| 3,431,143 | 3/1969 | Johnson et al. | 162—164X |

S. LEON BASHORE, Primary Examiner

A. L. CORBIN, Assistant Examiner

U.S. Cl. X.R.

162—181, 182, 183